United States Patent [19]

Cain

[11] Patent Number: 4,826,598

[45] Date of Patent: May 2, 1989

[54] HERMETICALLY SEALED TRANSMISSION FILTER

[75] Inventor: Thomas A. Cain, Woodstock, Ill.

[73] Assignee: Filtertek, Inc., Hebron, Ill.

[21] Appl. No.: 803,127

[22] Filed: Nov. 29, 1985

[51] Int. Cl.[4] .................. B01D 35/02; F01M 11/03
[52] U.S. Cl. .................. 210/445; 210/450; 210/453; 55/491; 55/502; 55/503; 29/902; 264/DIG. 48
[58] Field of Search ............ 210/445, 450, 453; 55/491, 502, 503, 511; 264/255, 258, 262, 367, 267, D48; 29/163.5 F; 156/99, 107

[56] References Cited

U.S. PATENT DOCUMENTS

| | | | |
|---|---|---|---|
| 3,686,835 | 8/1972 | Strange et al. | 210/445 |
| 3,782,083 | 1/1974 | Rosenberg | 55/491 |
| 3,796,027 | 3/1974 | Gumtow | 55/503 |
| 3,815,754 | 6/1974 | Rosenberg | 210/445 |
| 3,872,576 | 3/1975 | Mott | 210/445 |
| 3,897,342 | 7/1975 | Schmid et al. | 210/445 |
| 3,932,153 | 1/1976 | Byrns | 55/511 |
| 3,957,469 | 5/1976 | Nebash | 55/503 |
| 4,113,627 | 9/1978 | Leason | 264/D48 |
| 4,136,011 | 1/1979 | Joseph et al. | 210/168 |
| 4,402,827 | 9/1983 | Joseph | 210/314 |
| 4,404,006 | 9/1983 | Williams et al. | 210/445 |
| 4,414,172 | 11/1983 | Leason | 264/255 |
| 4,450,078 | 5/1984 | Walker et al. | 210/315 |
| 4,450,081 | 5/1984 | Anderson et al. | 264/D48 |

Primary Examiner—Richard V. Fisher
Assistant Examiner—Wanda L. Millard
Attorney, Agent, or Firm—Willian Brinks Olds Hofer Gilson & Lione Ltd.

[57] ABSTRACT

An automatic transmission fluid filter is disclosed, comprised of a metal base member, a plastic cover member attached to the base member, enclosing a volume. Filtration material inside the volume is interposed between an inlet and outlet to the filter. A plastic overmold around the periphery of the union of the metal and plastic members hermetically seals the filter except at the inlet and outlet. In a preferred embodiment, the metal base member includes a flanged edge which is secured to a flanged edge of the cover member by the overmold. Slots through the flange of the base member allow plastic of the overmold to flow through, connecting together plastic on both sides of the flange. Also, the base member flange ends curled lip embedded in the plastic of the overmold. Edge sections of the filtration material extend to and between the union of the base and cover members over some sections of the edge of the filter. At those sections the cover member has a raised lip which is configured to be backed up by a portion of the mold section during the overmolding process. In the other section during the overmolding process. In the other sections a mating elevation and depression in flanges of the cover and base members mechanically lock the members and prevent them from sliding relative to each other.

11 Claims, 2 Drawing Sheets

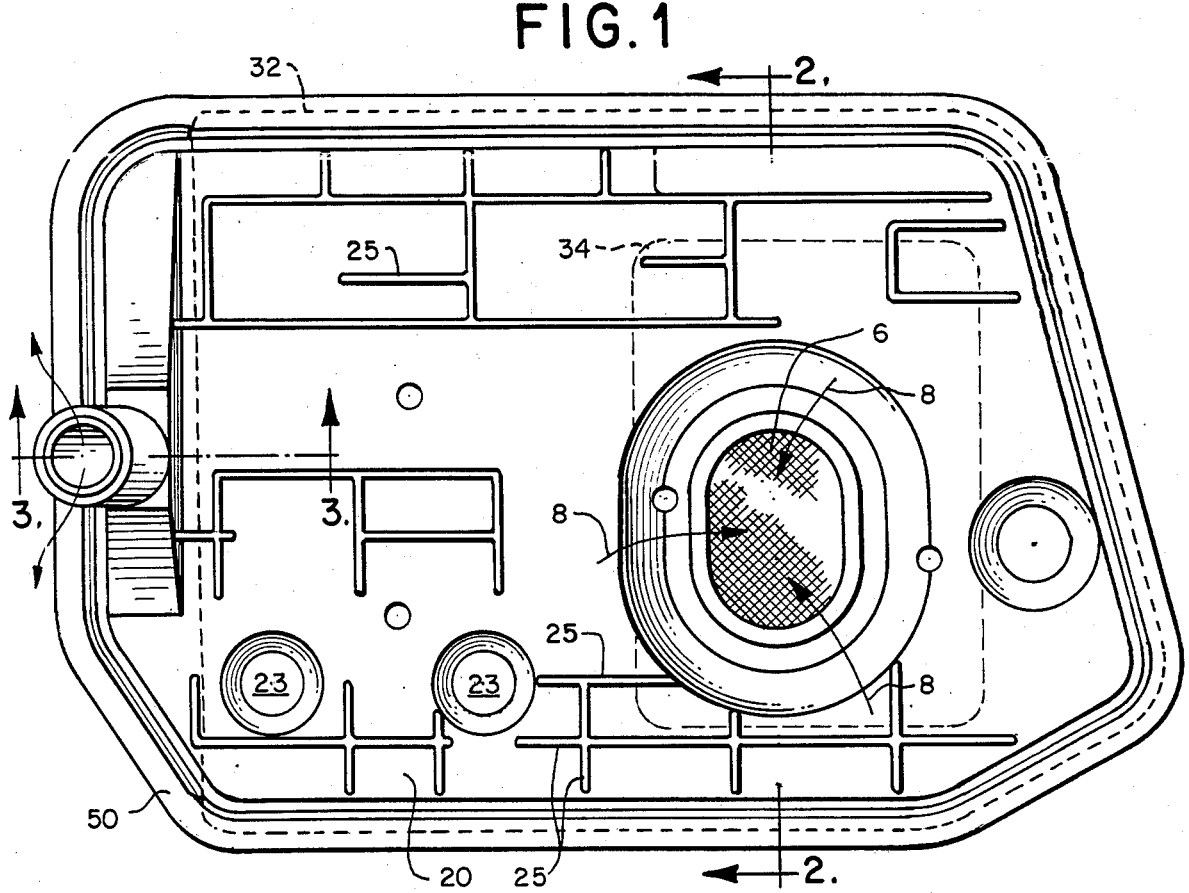
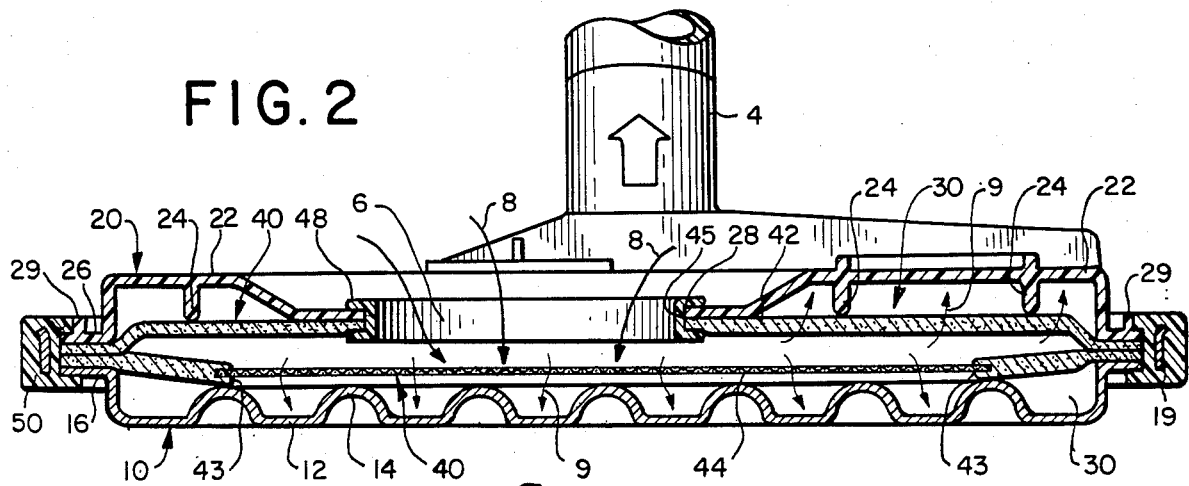
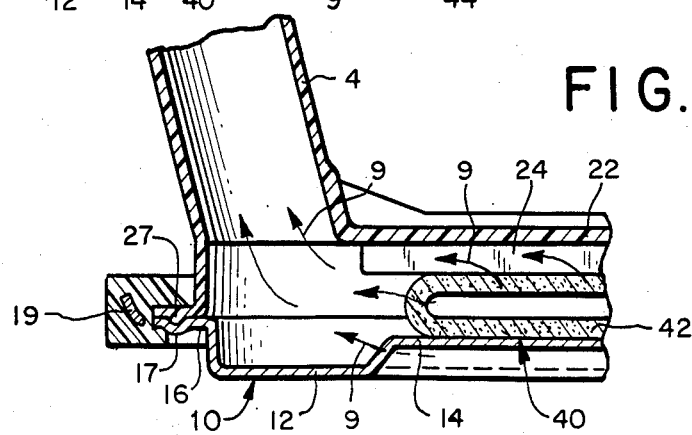

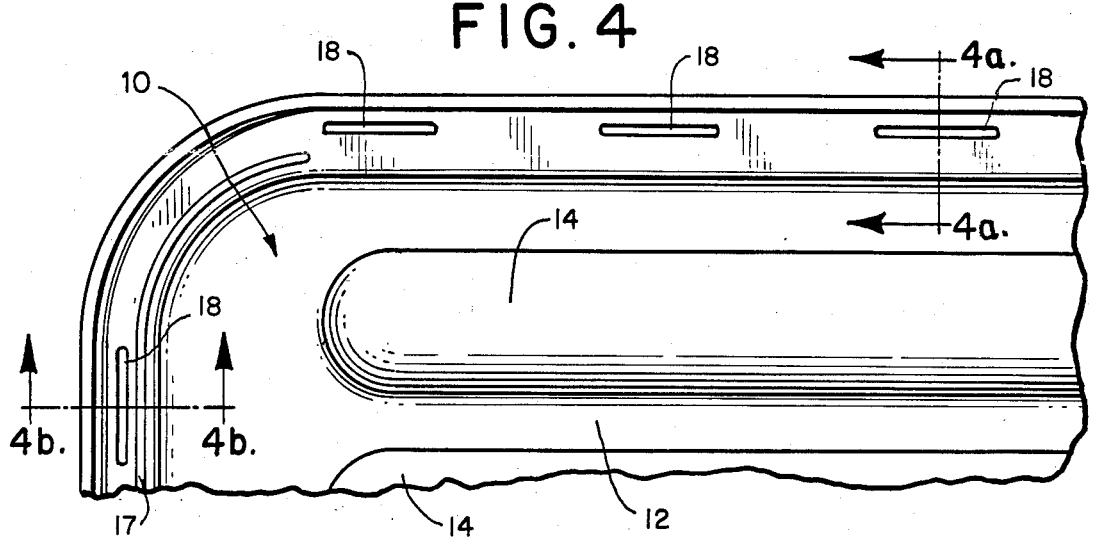
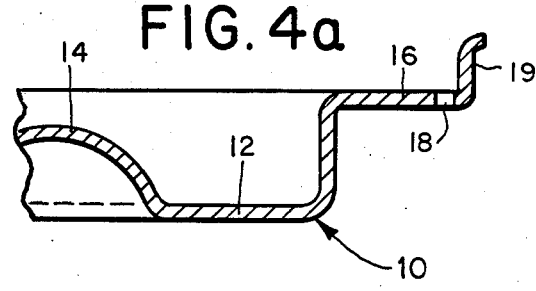
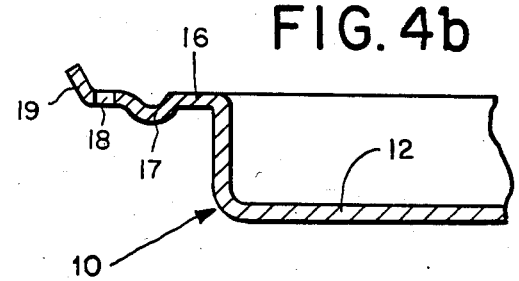
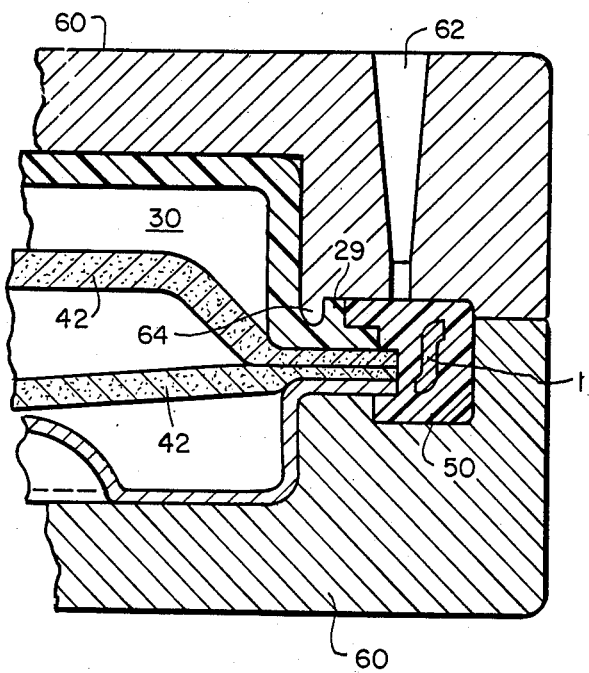
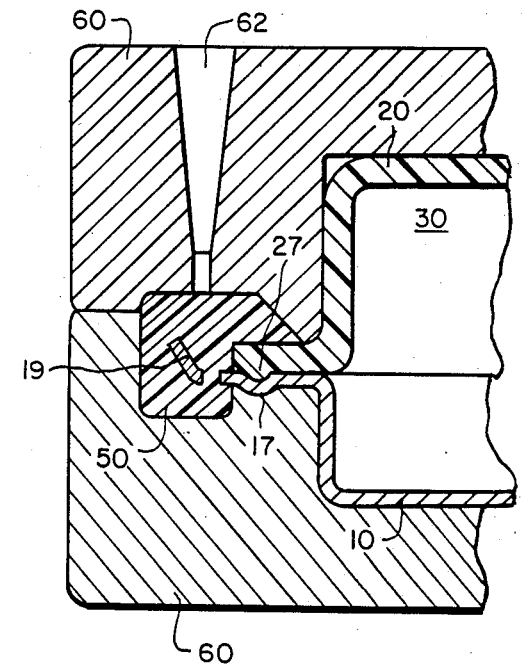

HERMETICALLY SEALED TRANSMISSION FILTER

BACKGROUND OF THE INVENTION

This invention relates to fluid filters, and more particularly to hermetically sealed automatic transmission fluid filters.

Automatic transmissions require a filter to remove harmful materials from the fluid being circulated through the transmission system. Various configurations of filters have been suggested for use in automatic transmission fluid circulating systems. One such filter is disclosed in U.S. Pat. No. 4,402,827 to Joseph. This filter is made from two generally rectangular cup-shaped pan members having flanged peripheries fastened together in opposed relation. A filter element is made in part from a long piece of resin-impregnated felt, folded over double. The edges of the filter element are captured between the fastened flange sections of the pan members.

Like most automatic transmission filters, the Joseph filter is designed to be placed in the transmission fluid sump area on the inlet side of the fluid pump. For this reason, it has an outlet tube extending up from the top pan member which conveys fluid to the pump. The inlet to the filter is a hole in the pan member positioned so as to be submerged in transmission fluid within the sump.

It is critical that the inlet to the filter remain submerged in transmission fluid. If air is allowed to pass through the filter, it could cause cavitation in the transmission pump and, with a loss in hydraulic pressure to the clutch, slippage between the clutch plates. Slippage results in a burning of the drive surfaces of the clutch and complete transmission failure within seconds after slippage begins.

For filters like those in the Joseph patent, having relative wide, flat bodies, the edges of the filter become exposed to air during normal operation of the automobile in which they are used. During violent maneuvers in starting and turning, the fluid in the sump is subjected to forces causing it to slosh to one side or another. If the filter edges are not sealed, air can enter the filter and have the above described effect.

In the past, filters made from a plastic top pan member and a metal base pan member have been assembled by crimping the edge of the metal around the edge of the plastic member. Tests have shown that such crimping is not effective for sealing the edges air tight. One of the major difficulties in getting such filter members sealed on the edges is that the filters are subject to operating conditions ranging from −30° to +300° F. Under these conditions, it is very difficult to maintain an air-tight crimp seal with dissimilar materials. In addition, many sealant materials are not capable of withstanding this operating range.

SUMMARY OF THE INVENTION

An automatic transmission filter has been invented which is hermetically sealed on its edges by a plastic overmold. The filter has a metal base member, a plastic cover member, filtration material inside the volume defined by the union of the base and cover members interposed between the fluid inlet and outlet, and a plastic overmold around the periphery of the union of the metal and plastic members which hermetically seals the filter except for the inlet and outlet.

In the preferred embodiment, the plastic overmold is secured to the metal base member by being molded around a curled lip on the edge of the peripheral flange of the base member. In addition, slots through the flanged portion of the base member provide a path through which plastic flows during the molding process, securely connecting the plastic on both sides of the metal flange. A raised lip is provided around a portion of the flanged periphery of the plastic cover member which is backed by a steel ring in the mold section duing the molding process to prevent collapse of the cover during the overmolding. In filters using a folded filter element such as in the Joseph patent, the edges of the filter element extends beyond the edge of the top cover member and are contacted by the hot resin of the overmold to obtain a seal between the edges of the filter element. On the side of the filter adjacent the folded portion of the filter member, the flanged sections of the base and cover members are provided with a mating elevation and depression to mechanically interlock the flanges and prevent them from sliding relative to each other.

The overmold provides a hermetic seal to prevent air from entering the edges of the filter. The manner in which the overmold is secured to the pan members prevents separation of the filter components, even during changes in temperature experienced during normal transmission operating conditions.

Other advantages of the present invention, as well as the invention itself, will best be understood in view of the following detailed description of the presently preferred embodiment.

BRIEF DESCRIPTION OF THE DRAWINGS

FIG. 1 is a top plan view of a filter of the preferred embodiment of the present invention.

FIG. 2 is a sectional side view taken along line 2—2 of FIG. 1.

FIG. 3 is another sectional side view, taken along line 3—3 of FIG. 1.

FIG. 4 is a partial plan view of the metal base member of the filter of FIG. 1.

FIGS. 4a and 4b are sectional views taken respectively along lines 4a—4a and 4b—4b of FIG. 4.

FIG. 5 depicts the filter segment corresponding to FIG. 4a in the mold sections during the overmolding process.

FIG. 6 depicts the filter segment corresponding to FIG. 4b in the mold sections during the overmolding process.

DETAILED DESCRIPTION OF THE PREFERRED EMBODIMENT

As shown in FIG. 2, the transmission fluid filter of the presently preferred embodiment is generally flat except for an outlet tube 4 extending almost perpendicularly from the filter near the center of one edge of the filter. The outlet tube 4 connects with the transmission fluid pump (not shown). The top of the filter also has a fluid inlet 6 formed in plastic cover member 20 (see FIG. 1).

As shown in FIG. 2, the filter also comprises a metal base member 10 attached to the cover member 20, a plastic overmold 50 around the periphery of the filter, hermetically sealing the junction of the metal base member 10 and plastic cover member 20, and a filter element 40 inside the volume 30 formed by the cover and base members.

The base member 10 is cup-shaped and has a generally flat bottom wall 12 with a plurality of raised bosses or ribs 14. A flanged edge 16, spaced above the plane of the bottom wall 12, extends from the periphery of the base member 10. This flanged edge 16 has slots 18 through it (FIG. 4) and extends to form a curled lip 19 at its outside edge substantially perpendicular to the remainder of the flanged edge 16 (FIGS. 4a and 4b). In addition, on the left side of the filter (as viewed from FIGS. 1, 2 and 4), the flanged edge 16 of the base member 10 also includes a depression 17 running along the length of the flanged edge just inside from the slots 18, best seen in FIGS. 3 and 4b.

The cover member 20 is also generally cup-shaped with a top wall 22 raised above a flanged edge 26. The top wall 22 has a downward sloping surface near its center terminating in an inlet hole 28. The base member 10 and cover member 20 are positioned in opposed relationship, meeting at their respective flanged edges 16 and 26 to enclose the volume 30. The flanged edges 16 and 26 are substantially parallel (FIG. 2). Extending into the volume 30 perpendicularly from the top wall 22 of cover member 20 are ridges 24 integrally depending from the top wall 22. The top wall 22 also includes structural ribs 25 (FIG. 1) upstanding from its surface, as well as various depressions 23 which provide clearance to keep the filter from interferring with portions of the transmission when the filter is placed in the transmission sump.

As best seen in FIG. 2, a filter element 40 is enclosed within volume 30. The filter element 40 is an elongated, somewhat rectangular sheet folded in half, forming an envelope, the edges being clamped together between the junction of flanged edges 16 and 26. The dashed line 32 of FIG. 1 outlines the edges of filter element 40, the portion of line 32 on the left side of FIG. 1 outlining the fold. The fold itself is best seen in FIG. 3. Filter element 40 comprises a composite assembly including a fine first filtering material 42 in sheet form having an opening 43 in its surface and a coarse second filtering material 44 secured to material 42 over opening 43. The outline of opening 43 is depicted by dashed line 34 of FIG. 1. The filter element 40 includes a second, oval opening 45. The openings 43 and 45 are on opposite sides of the fold in material 42, and are thus spaced one over the other in volume 30. The edges of oval opening 45 correspond with the edges of the inlet hole 28 in the top wall 22 of cover member 20. A circumferentially continuous eyelet 48 sealingly fastens the edges of oval opening 45 to the inlet hole 28 and thus defines the fluid inlet 6. Fluid enters the filter and the envelope formed by the filter element 40 through inlet 6, as depicted by arrows 8 in FIGS. 1 and 2. Fluid passes through the envelope of filtration material 42 and 44 into volume 30 and passes out of the filter through outlet tube 4, as depicted by arrows 9 in FIGS. 2 and 3. Thus the filtration material is interposed between the inlet 6 and the outlet 4 inside the volume 30.

The present invention achieves the hermetic seal between the plastic cover member 20 and the metal base member 10 by use of a plastic overmold 50 around the union of the flanged edges 16 and 26, best seen in FIGS. 2 and 3. There are several features of the preferred embodiment which help to insure the hermetic seal of the overmold 50. First, the plastic of the overmold 50 on each side of the flange 16 is in direct contact with the plastic on the opposite side through the slots 18 in the flange 16. This helps to keep the overmold intact. Second, the curled lip 19 of the base member 10 is embedded in the plastic of the overmold 50. The curl and the rigidity of the plastic overmold 50 provides a mechanical lock between the base member 10 and the overmold 50. Third, the cover member 20 has an elevation 27 on its flange 26 which mates with the depression 17 on the left side of base member 10 (FIGS. 3 and 6). The mating depression 17 and elevation 27 mechanically interlock the base member 10 and cover member 20 and prevent lateral movement between them as they are held together by the overmold 50.

During the overmolding process, hot resin is fed into the mold sections 60 through the feeder and gate 62 (FIGS. 5 and 6). The hot resin of the overmold 50 adheres to the exposed edges of the filtration material 42 captured between flanges 16 and 26. The resin also adheres to the plastic cover member 10, thus forming a hermetic seal.

Those portions of the cover member 10 which are in contact with the edges of the filter element 40 include a raised lip 29 near the periphery of the flanged edge 26. This raised lip 29 is backed up by a steel ring 64 of the mold section 60 (FIG. 5) during the overmolding process. This feature has been found useful to prevent the cover member 20 from collapsing under the molding pressure of the overmold. No raised lip 29 is used on the edges of the cover member 20 not contacting the filtration material 42 (FIG. 6). Instead the overmold 50 is shaped to allow the mold section 60 to disengage after the overmolding process.

In the preferred embodiment, the cover member and overmold are made of glass filled nylon. The slots 18 are about 1.5 inches in length, about 0.03 inches wide and spaced about 3 inches from center to center. The fine first filtering material may be a resin-impregnated felt and the course second filtering material 42 may be a woven nylon mesh. Of course, a uniform (non-composite) filtration material may be used in constructing filters which benefit from the hermetic seal of the present invention.

Since other changes and modifications to the presently preferred embodiment may be made without departing from the scope of the invention, it should be understood that the preferred embodiment of the filter of the present invention described in detail herein is merely illustrative of various aspects of the invention, and that the invention is not limited thereto. It is intended that the following claims including all equivalents, therefore define the present inventions.

I claim:

1. An automatic transmission filter comprising:
   (a) a metal base member, having a flanged edge containing slots,
   (b) a plastic cover member attached to the base member to enclose a volume,
   (c) an inlet and outlet to said volume with filtration material interposed therebetween inside said volume, and
   (d) a plastic overmold around the periphery of the union of the metal and plastic members which hermetically seals said volume except at said inlet and outlet, the plastic of the overmold on each side of the metal flange being in direct contact with plastic on the other side through said slots.

2. The filter of claim 1 wherein the plastic cover member includes a raised lip near at least a portion of its periphery configured to be backed up by a portion of a mold section during molding of the overmold.

3. The filter of claim 1 wherein the metal base member includes a curled lip embedded in the plastic overmold.

4. The filter of claim 1 wherein the base member and cover member have edge sections which include a mating elevation and depression to mechanically interlock the members and prevent the base and cover member from sliding relative to each other.

5. In a transmission fluid filter having a pair of cup-shaped pan members fastened at their edges in an opposed relation and a folded filter element with its edges captured between the opposed peripheral edges of said pan members, said pan members being one of plastic and the other of metal, the improvement comprising:
   (a) a plastic overmold around the periphery of the edges of the metal and plastic pan members which hermetically seals said edges, and
   (b) both pan members having peripheries which are substantially parallel, the periphery of the metal pan member including an extended lip portion substantially perpendicular to the pan member peripheries, the periphery of said lip portion being embedded in said plastic overmold.

6. The filter of claim 5 wherein the edges of the folded filter element contact and are sealed by the plastic overmold material.

7. The filter of claim 5 wherein the edge sections of the pan members adjacent the folded side of the filter element include a mating elevation and depression to mechanically interlock the members and prevent them from sliding relative to each other.

8. The filter of claim 5 wherein the plastic pan member includes a raised lip near its outside periphery in contact with the edges of the filter element, said lip configured to be backed up by a portion of a mold section during molding of the overmold.

9. An automatic transmissions fluid filter comprising:
   (a) a top, pan shaped plastic cover having a flanged periphery,
   (b) a bottom pan shaped metal base member with a flanged periphery having slots therethrough and ending in a curled lip, said base member attached to said cover member in opposed relationship thereto,
   (c) a filter element folded within the volume enclosed by the cover and the base member, the edges of said filter element extending beyond the flanged periphery of the cover, and
   (d) a plastic overmold surrounding the union of the flanged peripheries of the cover and the base, embedding the curled lip and flowing through the slots of the base member flange and contacting the exposed extended edges of the filter element to provide a hermetic seal between the base and the cover.

10. The filter of claim 9 wherein the flanged periphery of the cover adjacent said edges of the filter element includes a lip configured to be backed by a steel ring in the mold section to prevent collapse of the cover under the molding pressure of the overmold.

11. The filter of claim 10 wherein the flanged sections of the base and cover adjacent the folded section of the filter element include a mating elevation and depression to mechanically interlock the flanges.

* * * * *

UNITED STATES PATENT AND TRADEMARK OFFICE
CERTIFICATE OF CORRECTION

PATENT NO.  : 4,826,598
DATED       : May 2, 1989
INVENTOR(S) : Thomas A. Cain

It is certified that error appears in the above-identified patent and that said Letters Patent is hereby corrected as shown below:

On the cover page under the heading "ABSTRACT," on lines 21 and 22 of the Abstract, please delete "In the other section during the overmolding process."

IN THE SUMMARY OF THE INVENTION

In column 2, line 10, please delete "duing" and substitute therefor --during--.

Signed and Sealed this

Twentieth Day of August, 1991

Attest:

HARRY F. MANBECK, JR.

Attesting Officer

Commissioner of Patents and Trademarks